Figure 1:
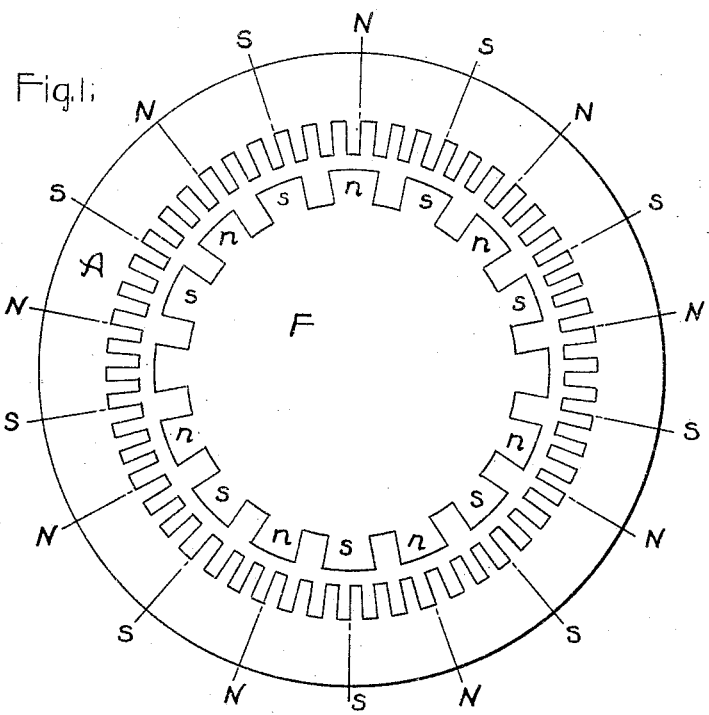

No. 785,532. PATENTED MAR. 21, 1905.
E. F. W. ALEXANDERSON.
SYNCHRONOUS MOTOR.
APPLICATION FILED AUG. 12, 1904.

2 SHEETS—SHEET 1.

WITNESSES:

INVENTOR:
Ernst F. W. Alexanderson,
by Albert G. Davis
Atty.

No. 785,532. PATENTED MAR. 21, 1905.
E. F. W. ALEXANDERSON.
SYNCHRONOUS MOTOR.
APPLICATION FILED AUG. 12, 1904.
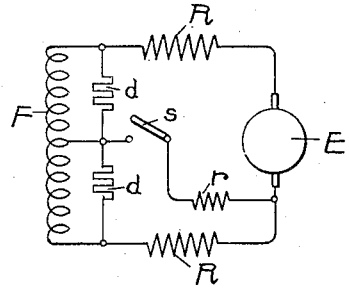
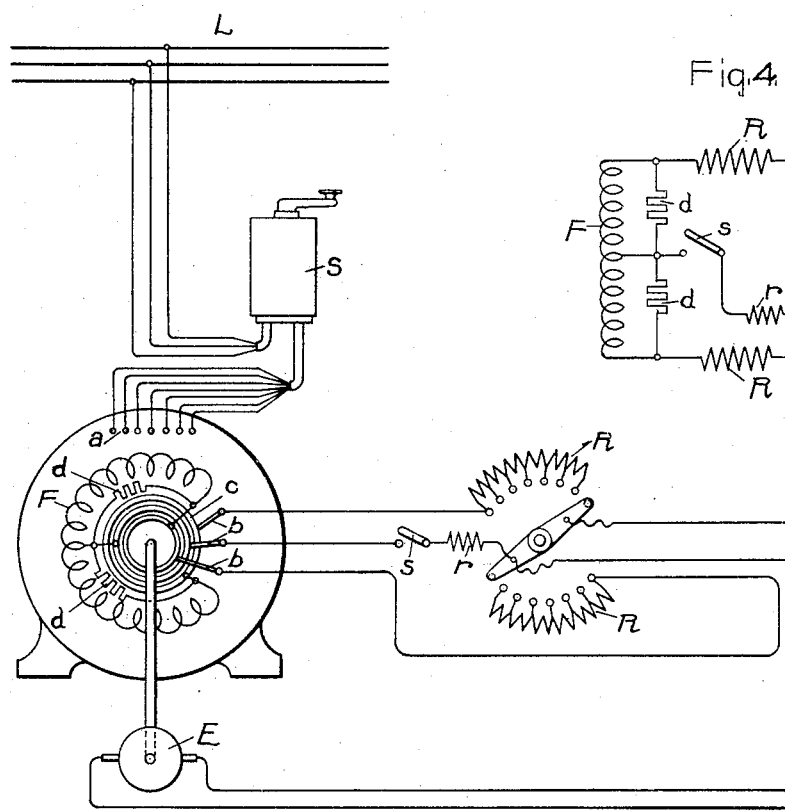
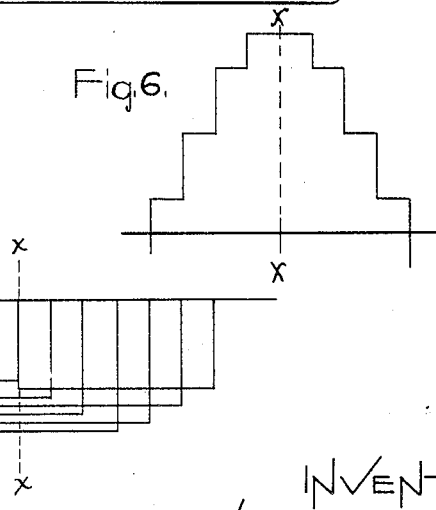
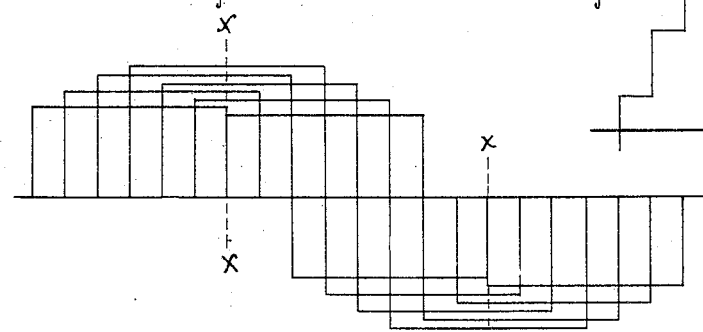
WITNESSES:
INVENTOR:
Ernst F. W. Alexanderson,
by Albert G. Davis,
Atty.

No. 785,532.                                    Patented March 21, 1905.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYNCHRONOUS MOTOR.

SPECIFICATION forming part of Letters Patent No. 785,532, dated March 21, 1905.

Application filed August 12, 1904. Serial No. 220,478.

*To all whom it may concern:*

Be it known that I, ERNST F. W. ALEXANDERSON, a subject of the King of Sweden and Norway, residing at Schenectady, county of Schenectady, State of New York, have invented certain new and useful Improvements in Synchronous Motors, of which the following is a specification.

My invention relates to alternating-current synchronous motors; and its object is to provide a simple and efficient form of synchronous motor with high starting torque.

Synchronous motors as ordinarily constructed with polar field structures have little starting torque. The field-poles tend to lock in position at starting, and even when short-circuited conductors are placed on the field-poles the starting torque is small at best. In application for Letters Patent Serial No. 193,512, filed by me February 15, 1904, I have described a self-starting multispeed synchronous motor in which the ordinary polar field structure is replaced by a structure having no projecting poles and carrying a distributed winding in a large number of slots. Such a winding corresponds to the secondary of an induction-motor, and consequently the motor may be started by short-circuiting the field-winding through a resistance. If a squirrel-cage winding is employed with such a field structure instead of short-circuiting the field-winding at starting or in addition thereto in order to increase the starting torque, the absence of poles enables the squirrel-cage winding to operate with the highest efficiency, as in an ordinary induction-motor, since the field has no tendency to lock in position. Such a motor, while possessing not only a high starting torque, but also the characteristic of rendering it possible to connect the field for a variable number of poles, is expensive to construct, since either the field or armature should have closed slots in order to avoid the production of harmonics, and placing a distributed winding in holes or closed slots is extremely costly. Moreover, such a motor does not utilize the copper and iron of the field structure to as great advantage as does a motor with a polar field structure. The increased length of the end connections of the field-coils requires a greater weight of copper, while the large number of slots on the surface of the structure renders the magnetic circuit less efficient than that of a polar structure.

The object of my present invention is to provide a synchronous motor having a high starting torque and yet preserving the advantages of the polar structure as regards economy of material. I accomplish this by giving the poles of the field structure a fractional pitch with respect to the armature-poles, so that instead of having a field-pole opposite each armature-pole, as in the ordinary synchronous motor, only a few poles at a time are directly in front of the armature-poles, while the others are displaced by a greater or less amount. With such an arrangement as this the locking tendency which exists where the pitches of the field-poles and armature-poles are equal is completely destroyed, and as a result the motor may be designed for a high starting torque.

Another feature of my invention consists in so connecting the coils on the different poles that the field-winding may act as a short-circuited polyphase secondary for the armature, so that a high starting torque may be obtained.

Another feature of my invention consists in varying the number of poles of the armature in such manner as to obtain a multispeed synchronous motor without varying the connections of the field.

My invention will best be understood by reference to the accompanying drawings, in which—

Figure 2:
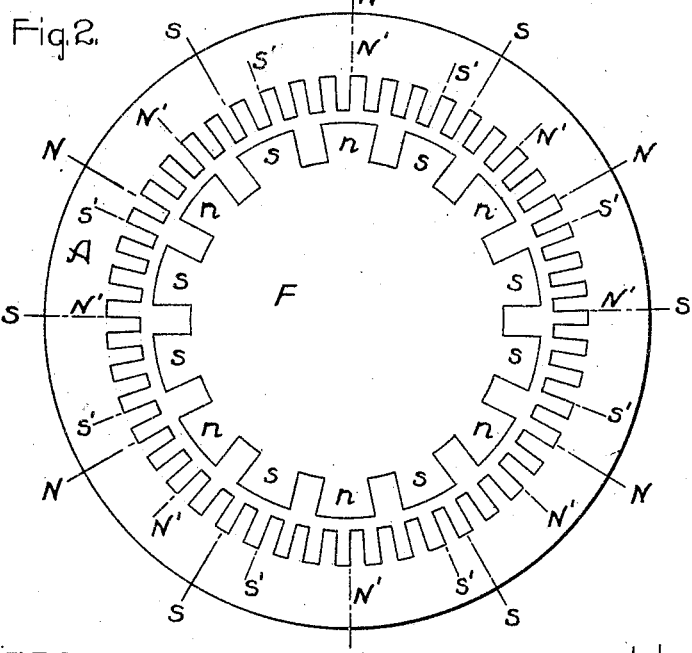

Figure 1 shows diagrammatically a synchronous motor structure arranged in accordance with my invention. Fig. 2 shows a modification of the same arranged for a different number of poles. Fig. 3 shows the connections for starting the motor. Fig. 4 is a simplified diagram of these connections; and Figs. 5 and 6 are explanatory diagrams showing, respectively, the voltages induced in the armature by the several poles and the resultant armature voltage.

Referring first to Fig. 1, A represents the armature of a synchronous motor arranged in the usual manner with a plurality of slots on its inner periphery adapted to receive a distributed winding. F represents a field structure which is provided with the usual polar projections. The armature-winding is assumed to be connected to produce eighteen poles, as indicated by the lines NS, NS, &c. The field structure, however, instead of having eighteen polar projections, as in the ordinary synchronous motor, has only sixteen polar projections, and two of these are left blank. The polarities of the polar projections are indicated by the letters $n$ $s$, &c. It will be seen that while the upper pole $n$ is directly below armature-pole N the poles $s$ on either side are displaced a certain amount from the armature-poles S. This displacement increases in successive poles until when the fourth pole on either side of the uppermost pole $n$ is reached it will be seen that it is halfway between two poles N and S. This pole is consequently left blank, and the two poles on opposite sides of the blank pole are wound for opposite polarities, like adjacent poles of an ordinary field, as indicated by the letters $s$ and $n$. The lower half of the field structure has its coils consequently wound opposite to the way they would be wound in the normal arrangement with coils on all the poles; but by means of this reversal in its relation to the armature it is exactly the same as that of the upper half. The resultant voltages induced in the armature by the several poles are indicated in Fig. 5. The rectangle which is bisected by the dotted line $x$ $x$ represents the electromotive force induced in the armature by the pole $n$ in Fig 1, which is directly opposite the armature-pole N. The rectangles at either side represent the electromotive forces induced by the displaced poles on either side of the uppermost pole $n$. By connecting these induced electromotive forces in series, however, the resultant electromotive force shown in Fig. 6 is obtained. This electromotive force approximates in general form a sine curve. Consequently a motor arranged as in Fig. 1 will operate like an ordinary synchronous motor when brought up to speed and excited, but will not possess the locking tendency at starting exhibited by the ordinary synchronous motor.

The arrangement shown in Fig. 1, in which two diametrically opposite poles are left blank applies to a polar structure of any number of poles provided the number of pairs of poles is divisible by two. If the number of pairs of poles is odd, however, the arrangement shown in Fig. 2 should be employed. In this figure I have shown a field structure having fourteen poles. Instead of leaving two diametrically opposite poles blank on two diametrically opposite points of the field structure two adjacent polar projections are wound for the same polarity. The reason for this will be obvious from observing the positions of the field-poles relative to the armature-poles NS, &c. It will be seen that the third and fourth poles from the uppermost pole $n$ are equally displaced on opposite sides of the armature-poles S. Consequently in order to make the upper and lower halves of the field structure symmetrical with respect to the armature-poles it is necessary to make two adjacent poles of the same polarity instead of leaving one pole blank. In this arrangement, as in that of Fig. 1, the coils on half of the field are wound opposite to the normal arrangement with respect to the other half. Furthermore, in Fig. 2 I have shown the armature-poles, as indicated by NS, &c., as smaller in number than the field-poles instead of greater, as in Fig. 1. In Fig. 2 the field has fourteen poles, while there are twelve armature-poles, (indicated by the letters NS, &c.) Obviously the connections of the armature of Fig. 2 may be changed to give a number two in excess of the number of field-poles, as in Fig. 1. Such an arrangement is indicated by the positions of the reference characters N' S', &c. In other words, the same field may serve without any change for two numbers of armature-poles, either two greater or two less in number than the field-poles. Thus the sixteen-pole field of Fig. 1 may serve not only for an eighteen-pole armature, as shown, but it may also serve for a fourteen-pole armature. Furthermore, the difference between the number of poles of field and armature may be any multiple of two. Thus by simply doubling the pole-numbers (shown in Fig. 1) a thirty-two pole field structure may serve for a thirty-six or twenty-eight pole armature.

In my application for Letters Patent Serial No. 166,675, filed July 23, 1903, I have shown a general method for obtaining any desired number of poles in an alternating-current motor. By the use of the method there set forth for changing the number of armature-poles a motor constructed in accordance with my present invention may be made not only a self-starting synchronous motor, but also a multispeed synchronous motor without any change of the field connections.

Referring again to Fig. 5, it will be seen that if all the poles which produce electromotive forces to the left of the dotted line $x$ $x$ were connected in one group, while all the poles producing electromotive forces to the right of the dotted line $x$ $x$ were connected in a second group, the two groups would correspond to the two phases of an ordinary two-phase winding. By taking advantage of this fact and by properly connecting the field-poles the field-winding may be caused to act as a polyphase winding at starting, so as to obtain a greater starting torque than would be possible with a single-phase winding. Thus in Fig. 3 I have shown the field-winding (indicated diagrammatically at F) with its terminals connected to two collector-rings $c$ and with a third lead brought from the central point of the winding to a third collector-ring. It will be understood that the portions of the field-winding on opposite sides of this central point represent the two groups of field-coils above mentioned. The two portions of the field-winding consequently represent in starting the two phases of a two-phase winding. The armature-terminals $a$ are connected to the line L through a switch S, which may be arranged to connect the armature for two different numbers of poles, both differing by two from the number of poles of the field, while the field-winding is connected through the brushes $b$ to a rheostat R. The field-terminals may also be connected directly to each other through resistances $d\ d$, which may serve merely as discharge resistances at starting or which may be properly proportioned to act as starting resistances, in which case the rheostat R may be open-circuited at starting, as shown. E represents an exciter which is connected to the movable member of the rheostat R. This movable member is also connected through a resistance $r$ and a switch $s$ to the brush $b$, bearing on the collector-ring, to which is connected the central lead from the field-winding F. These connections are clearly shown in Fig. 4. The resistances $d\ d$ short-circuit the two portions of the field-winding independently at starting, or if rheostat R is used for starting when the switch $s$ is closed each phase formed by the field-winding F is short-circuited independently of the other through the rheostat, and the field-winding acts in starting like an ordinary polyphase short-circuited secondary. The exciter-armature E may be connected in the field-circuit at starting, since if it is driven by the synchronous motor, as shown in Fig. 3, it has no voltage at starting, or if it is driven from the separate source it will have little effect if the entire rheostat resistance R is in circuit. After the motor has been started, either by means of the resistances $d\ d$ or the rheostat R, the rheostat resistance is gradually cut out and the field of the motor is excited. The motor is consequently pulled into synchronism, at which point the switch $s$ may be opened, and the motor will operate synchronously.

Although I have illustrated my invention somewhat diagrammatically in the drawings, it will be understood that it is applicable to to any well-known form of synchronous motor with polar projections.

Many modifications may be made in the arrangement of parts and the connections of the circuits, and I aim in the appended claims to cover all such modifications which are within the scope of my invention.

What I claim as new, and desire to secure by Letters Patent of the United States, is—

1. In a synchronous motor, an armature structure adapted to receive a distributed winding, and a field structure having projecting poles of a polar pitch unequal to the pitch of the poles produced by the armature-winding.

2. In a synchronous motor, an armature having a distributed winding connected to produce equally-distributed poles, and a field structure having projecting poles of a pitch unequal to the polar pitch of the armature.

3. In a synchronous motor, a field structure having projecting poles unequal in number to the poles produced by the armature-winding.

4. In a synchronous motor, an armature structure adapted to receive a distributed winding, and a field structure having projecting poles differing in number by a multiple of two from the number of poles produced by the armature-winding.

5. In a synchronous motor, a field structure having projecting poles, an armature structure adapted to receive a distributed winding, and means for connecting the armature-winding to produce a number of poles differing by a multiple of two from the number of poles of the field structure.

6. In a synchronous motor, a field structure having projecting poles, and means for connecting the armature-winding for two different numbers of poles each differing by a multiple of two from the number of poles of the field structure.

7. In a synchronous motor, a field structure having projecting poles of a polar pitch unequal to the pitch of the poles produced by the armature-winding, the coils on one-half the field structure being wound opposite to normal.

8. In a synchronous motor, a field structure having projecting poles unequal in number to the poles produced by the armature-winding, the coils on one-half the field structure being wound opposite to normal.

9. In a synchronous motor, a field structure having projecting poles differing in number by two from the number of poles produced by the armature-winding, the coils on one-half the field structure being wound opposite to normal.

10. In a synchronous motor, a field structure having projecting poles of a polar pitch unequal to the pitch of the poles produced by the armature-winding, and means for short-circuiting the field-winding through a variable resistance to start the motor.

11. In a synchronous motor, a field structure having projecting poles of a polar pitch unequal to the pitch of the poles produced by the armature, whereby a portion of the field-poles are at any instant ahead of the corresponding armature-poles and a second portion are behind, said two portions being connected in separate groups, and means for short-circuiting said groups independently at starting.

12. In a synchronous motor, a field structure having projecting poles of a polar pitch unequal to the pitch of the poles produced by the armature, whereby a portion of the field-poles are at any instant ahead of the corresponding armature-poles and a second portion are behind, said two portions being connected in separate groups, means for short-circuiting said groups independently at starting, and means for connecting the two groups in series to a source of direct current when the motor is up to synchronism.

13. In a synchronous motor, a field structure having projecting poles of a polar pitch unequal to the pitch of the poles produced by the armature-winding, whereby a portion of the field-poles are at any instant ahead of the corresponding armature-poles and a second portion are behind, said two portions being connected in separate groups and the groups being connected in series, and means for connecting the terminals of the field-winding to the terminals of a resistance and connecting the point of connection between the groups to an intermediate point on the resistance whereby said field-winding operates as a short-circuited two-phase winding at starting.

14. In a synchronous motor, a field structure having projecting poles of a polar pitch unequal to the pitch of the poles produced by the armature, whereby a portion of the field-poles are at any instant ahead of the corresponding armature-poles and a second portion are behind, said two portions being connected in separate groups, and means for short-circuiting each group through a resistance at starting, whereby said groups operate as the two phases of a short-circuited two-phase winding to start the motor.

In witness whereof I have hereunto set my hand this 10th day of August, 1904.

ERNST F. W. ALEXANDERSON.

Witnesses:
BENJAMIN B. HULL,
HELEN ORFORD.